United States Patent
Hanisch et al.

(10) Patent No.: US 8,284,193 B2
(45) Date of Patent: Oct. 9, 2012

(54) SYSTEM AND METHOD FOR COMPOSITION OF NURBS SURFACES

(75) Inventors: Joerg Hanisch, La Habra, CA (US); Lian Fang, Irvine, CA (US); Show Wang, Huntington Beach, CA (US)

(73) Assignee: Siemens Product Lifecycle Management Software Inc., Plano, TX (US)

(*) Notice: Subject to any disclaimer, the term of this patent is extended or adjusted under 35 U.S.C. 154(b) by 849 days.

(21) Appl. No.: 12/147,270

(22) Filed: Jun. 26, 2008

(65) Prior Publication Data

US 2009/0048812 A1 Feb. 19, 2009

Related U.S. Application Data

(60) Provisional application No. 60/946,839, filed on Jun. 28, 2007.

(51) Int. Cl.
*G06T 17/00* (2006.01)
*G06T 15/00* (2006.01)

(52) U.S. Cl. ......... 345/420; 345/419; 345/606; 345/442

(58) Field of Classification Search .......... 345/419–423, 345/619; 700/180, 182; 703/1, 2, 5, 22
See application file for complete search history.

(56) References Cited

U.S. PATENT DOCUMENTS

| | | | |
|---|---|---|---|
| 7,099,803 B1* | 8/2006 | Rappoport et al. | 703/1 |
| 7,352,369 B2* | 4/2008 | Spicer et al. | 345/420 |
| 7,643,026 B2* | 1/2010 | Chai et al. | 345/420 |

OTHER PUBLICATIONS

Farin et al. (Handbook of Computer Aided Geometric Design, Farin, Gerald; Hoschek, Josef; Kim, Myung-Soo; Hoschek, Josef; Kim, Myung-Soo ; ISBN-10: 0444511040, ISBN-13: 9780444511041, 808 p, 2002; Publisher: North-Holland) pp. 120-121 and 160, see attached.*
Yannis Avrithis, Yiannis Xirouhakis, Stefanos Kollias, Affine-invariant curve normalization for object shape representation, classification, and retrieval, Machine Vision and Applications, 2001—Springer, Received: Apr. 29, 2000 / Accepted: Feb. 21, 2001.*
T.J.R. Hughes , J.A. Cottrell, Y. Bazilevs, Isogeometric analysis: CAD, finite elements, NURBS, exact geometry and mesh refinement, Computer Methods Applied Mechanics and Engneering. 194 (2005) 4135-4195.*

* cited by examiner

*Primary Examiner* — Ulka Chauhan
*Assistant Examiner* — Sultana M Zalalee

(57) ABSTRACT

A system, method, and computer program for preserving design intent of a Non-Uniform Rational B-spline (NURBS) surface without representation of a parent surface, comprising representing an output surface having control points that is independent from a refinement of the surface; interpolating a base surface from the output surface; calculating a delta vector that is a difference between the output surface and the base surface; and transforming the delta vector based upon a local coordinate system of a normal vector and a tangent plane of the base surface and appropriate means and computer-readable instructions.

19 Claims, 5 Drawing Sheets

315

320

SYSTEM AND METHOD FOR COMPOSITION OF NURBS SURFACES

CROSS-REFERENCE TO RELATED APPLICATIONS

This Application claims priority to Provisional U.S. Application Ser. No. 60/946,839, filed on Jun. 28, 2007.

TECHNICAL FIELD

The system of the innovations described herein relate generally to software applications. More specifically, the system relates to design with CAD systems.

BACKGROUND

A feature-based or history-based computer aided design (CAD) system preserves the steps or history of how a three-dimensional (3D) model or part is created as a sequence of design features by recording the input parameters of each of such features. This recordation allows the user, designer or engineer the capability to return to a previously created 3D model and make changes to one or more of those features. The CAD system updates the model automatically by propagating these changes to any subsequent feature that depends on the changed feature(s).

In free-form applications, designers often manipulate the control points of Non-Uniform Rational B-spline (NURBS) surfaces as part of modeling workflow. Aesthetic objectives such as shape, curvature flow, and control points are of higher concern than the precise values of the control point positions. The storage of control points directly as feature parameters does not suit the purpose of capturing the design intent of the control point manipulations, because it reacts unpredictably to geometry changes of parent features, or does not react at all. "Design intent" is commonly understood in the art to be the intellectual arrangement of model features that may include dimensions, for example. Design intent governs the relationship between features in a part and parts in and among assemblies that can also include components, all of which are commonly understood in the art.

Additionally, when the NURBS surface of the parent feature has changed, the degree, number of patches (known sequences), and number of control points (poles) of an associated child surface can also change. This makes the direct storing of the altered control points as feature parameters of a control-point-manipulation feature meaningless. Even if the geometry of the parent NURBS surface has not changed it can have different representation and, a different degree, known sequence, and control points.

The inventors have advantageously recognized a need for a system and method to preserve the design integrity control-point manipulation when parent geometry has changed that does not rely on the particular representation of the parent NURBS surface.

SUMMARY

To achieve the foregoing, and in accordance with the purpose of the presently preferred embodiment as broadly described herein, the present application provides a method for preserving design intent of a Non-Uniform Rational B-spline (NURBS) surface without representation of a parent surface, comprising representing an output surface having control points that is independent from a refinement of the surface; interpolating a base surface from the output surface; calculating a delta vector that is a difference between the output surface and the base surface; and transforming the delta vector based upon a local coordinate system of a normal vector and a tangent plane of the base surface. The method, wherein the output surface is a NURBS surface. The method, wherein the refinement is a degree elevation. The method, wherein the refinement is a knot sequence. The method, wherein the interpolating of the base surface occurs at a Greville abscissae. The method, wherein the normal vector and the tangent plane are first partial derivatives. The method, wherein the transforming of the base surface occurs at an associated Greville abscissa.

Another advantage of the presently preferred embodiment is to provide a system for a computer system, wherein the computer system includes a memory, a processor, a user input device, and a display device; a computer generated geometric model stored in the memory in the memory of the computer system, wherein the geometric model is in a computer-aided design (CAD) format; and wherein a user uses the computer system and the computer system represents an output surface having control points that is independent from a refinement of the surface, interpolates a base surface from the output surface, calculates a delta vector that is a difference between the output surface and the base surface, and transforms the delta vector based upon a local coordinate system of a normal vector and a tangent plane of the base surface. The system, wherein the output surface is a NURBS surface. The system, wherein the refinement is a degree elevation. The system, wherein the refinement is a knot sequence. The system, wherein the interpolating of the base surface occurs at a Greville abscissae. The system, wherein the normal vector and the tangent plane are first partial derivatives. The system, wherein the transforming of the base surface occurs at an associated Greville abscissa.

And another advantage of the presently preferred embodiment is to provide a data processing system having at least a processor and accessible memory to implement a method for preserving design intent of a Non-Uniform Rational B-spline (NURBS) surface without representation of a parent surface, comprising means for representing an output surface having control points that is independent from a refinement of the surface; means for interpolating a base surface from the output surface; means for calculating a delta vector that is a difference between the output surface and the base surface; and means for transforming the delta vector based upon a local coordinate system of a normal vector and a tangent plane of the base surface.

Yet another advantage of the presently preferred embodiment is to provide a data processing system having at least a processor and accessible memory to implement a system for preserving design intent of a Non-Uniform Rational B-spline (NURBS) surface without representation of a parent surface, comprising a computer system, wherein the computer system includes a memory, a processor, a user input device, and a display device; a computer generated geometric model stored in the memory in the memory of the computer system, wherein the geometric model is in a computer-aided design (CAD) format; and wherein a user uses the computer system and the computer system represents a design model having an associated design intent with a parent surface and a child surface, modifies the child surface independent from the parent surface in a manipulation operation, and preserves the design intent from the manipulation operation.

Other advantages of the presently preferred embodiment will be set forth in part in the description and in the drawings that follow, and, in part will be learned by practice of the presently preferred embodiment. The presently preferred embodiment will now be described with reference made to the following Figures that form a part hereof. It is understood that other embodiments may be utilized and changes may be made without departing from the scope of the presently preferred embodiment.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENTS

1. Computer System

Figure 4:
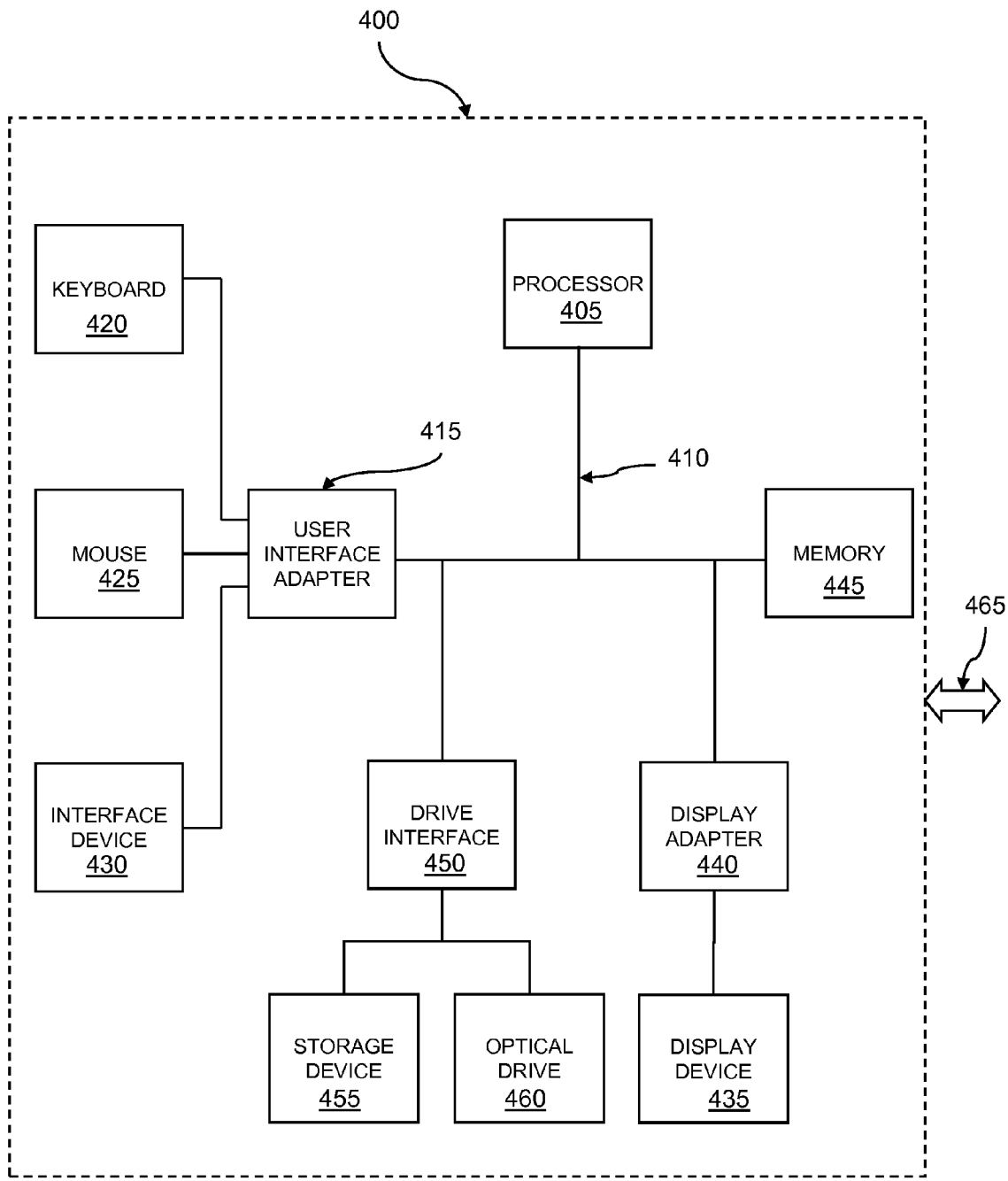
FIG. 4 is a block diagram of a computer environment in which the presently preferred embodiment may be practiced.

The numerous innovative teachings of the present application will be described with particular reference to the presently preferred embodiments. It should be understood, however, that this class of embodiments provides a few examples of the many advantageous uses of the innovative teachings herein. The presently preferred embodiment provides, among other things, a system and method for composition of NURBS surfaces. Now therefore, in accordance with the presently preferred embodiment, an operating system executes on a computer, such as a general-purpose personal computer. FIG. 4 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation particular abstract data types. The presently preferred embodiment may be performed in any of a variety of known computing environments.

Referring to FIG. 4, an exemplary system for implementing the presently preferred embodiment includes a general-purpose computing device in the form of a computer 400, such as a desktop or laptop computer, including a plurality of related peripheral devices (not depicted). The computer 400 includes a microprocessor 405 and a bus 410 employed to connect and enable communication between the microprocessor 405 and a plurality of components of the computer 400 in accordance with known techniques. The bus 410 may be any of several types of bus structures including a memory bus or memory controller, a peripheral bus, and a local bus using any of a variety of bus architectures. The computer 400 typically includes a user interface adapter 415, which connects the microprocessor 405 via the bus 410 to one or more interface devices, such as a keyboard 420, mouse 425, and/or other interface devices 430, which can be any user interface device, such as a touch sensitive screen, digitized pen entry pad, etc. The bus 410 also connects a display device 435, such as an LCD screen or monitor, to the microprocessor 405 via a display adapter 440. The bus 410 also connects the microprocessor 405 to a memory 445, which can include ROM, RAM, etc.

The computer 400 further includes a drive interface 450 that couples at least one storage device 455 and/or at least one optical drive 460 to the bus. The storage device 455 can include a hard disk drive, not shown, for reading and writing to a disk, a magnetic disk drive, not shown, for reading from or writing to a removable magnetic disk drive. Likewise the optical drive 460 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 400.

The computer 400 can communicate via a communications channel 465 with other computers or networks of computers. The computer 400 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 445 of the computer 400. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

2. Composition of NURBS Surfaces

Figure 1:
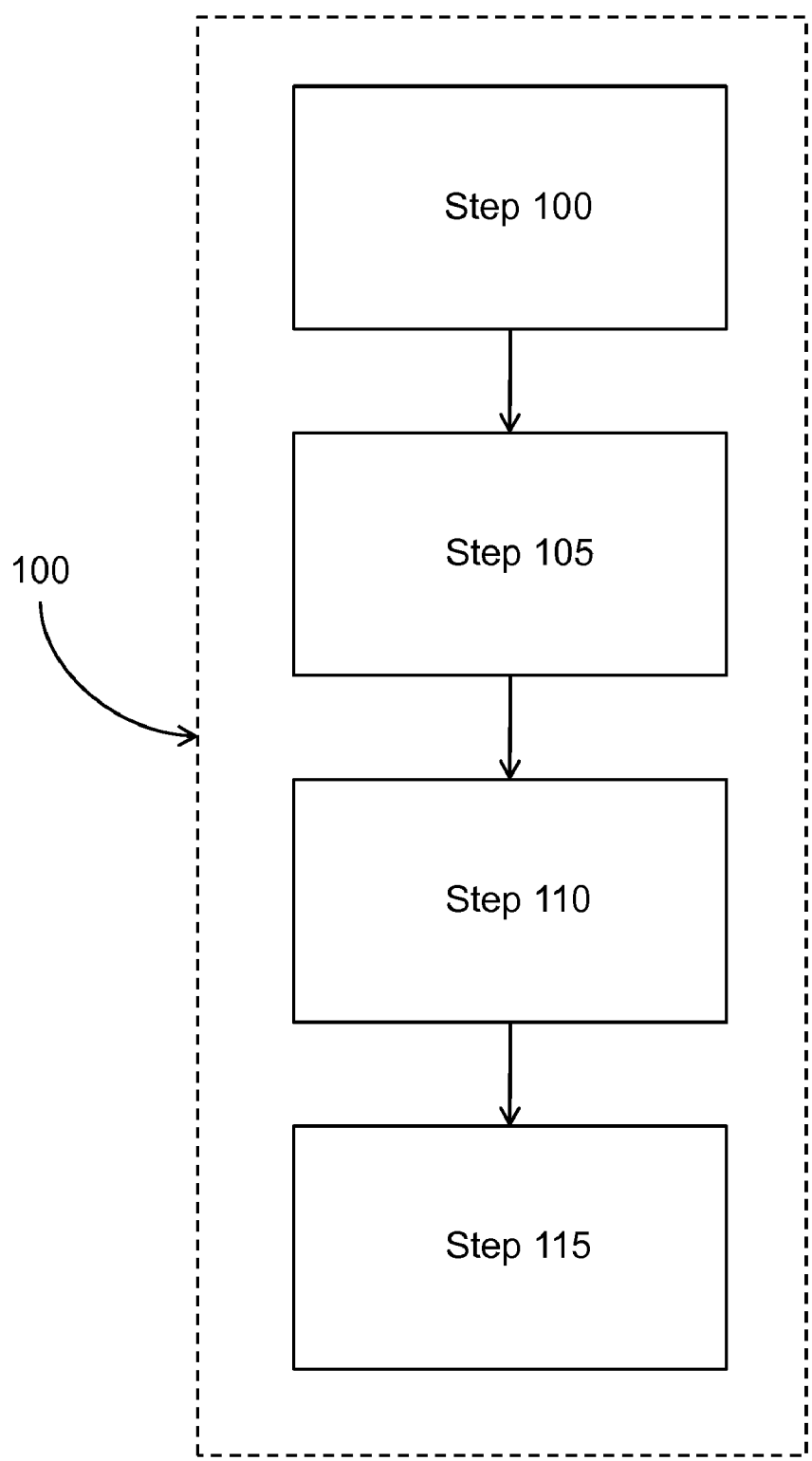
FIG. 1 is a logic flow diagram of the method employed by the presently preferred embodiment.

FIG. 1 is a logic flow diagram of the method employed by the presently preferred embodiment. Referring to FIG. 1, the presently preferred embodiment discloses a method for preserving design intent of a control point manipulation 100 as it begins to represent an output surface having control points that is independent from a refinement of the surface (Step 100). Next, the method for preserving design intent interpolates a base surface from the output surface (Step 105). Then the method calculates a delta vector that is a difference between the output surface and the base surface (Step 110). And finally the method transforms the delta vector based upon a local coordinate system of a normal vector and a tangent plane of the base surface (Step 115). The methods for preserving design intent of a control point manipulation in accordance with the presently preferred embodiment are set forth in more detail below.

3. Initial Considerations

The number of B-spline surfaces, B-surfaces, of a NURBS model under consideration preferably share the same parameter domain [0, 1]×[0, 1], and are non-periodic, non-rational B-surfaces. The result of this condition is that the multiplicity of the end knots 0 and 1 is the same as the order of B-surface in the respective direction so that continuous B-surfaces, i.e., the multiplicity of the inner knots is less than the order of the B-surface in the respective direction, are addressed. A based surface b is denoted by:

$$b(u,v) = \sum_{k=0}^{K-1}\sum_{l=0}^{L-1} b_{k,l} N_{r,k,p}(u) N_{s,l,q}(v)$$

where r>1 and s>1 are the orders and $p=\{p_k\}_{k=0}^{K+r-1}$ and $q=\{q_l\}_{l=0}^{L+s-1}$ are the knot sequences of b in u-direction and v-direction, respectively. $N_{r,k,p}$ denotes the k-th normalized B-spline of order r with respect to the knot sequence p (similar for $N_{s,l,q}$) and $b_{k,l} \in \mathbb{R}^3$ denotes the (k,l)-th control point (pole).

Similarly, an output surface c is denoted by:

$$c(u,v) = \sum_{i=0}^{I-1}\sum_{j=0}^{J-1} c_{i,j} N_{m,i,u}(u) N_{n,j,v}(v)$$

with orders m>1 and n>1 and $u=\{u_i\}_{i=0}^{I+m-1}$ and $v=\{v_j\}_{j=0}^{J+n-1}$ are the knot sequences. The orders, knot sequences and control points (poles) of the output surface c can be different from the base surface b. On the other hand, a delta surface d preferably shares the same orders and knot sequences as the output surface c, and is denoted by:

$$d(u,v) = \sum_{i=0}^{I-1}\sum_{j=0}^{J-1} d_{i,j} N_{m,i,u}(u) N_{n,j,v}(v)$$

with orders m>1 and n>1 and $u=\{u_i\}_{i=0}^{I+m-1}$ and $v=\{v_j\}_{j=0}^{J+n-1}$ are the knot sequences. For order r and knot sequence p, compute the k-th Greville abscissa as:

$$g(r,k,p) = \frac{1}{r-1}\sum_{i=1}^{r-1} p_{k+i}.$$

The (k,l)-th control point $b_{k,l}$ is assigned to its respective Greville abscissae (g(r, k, p), g(s, l, q)) in parameter domain and form a piece-wise bilinear surface of the poles of the base surface b (control polygon):

$$P(b)(u,v) = \sum_{k=0}^{K-1}\sum_{l=0}^{L-1} b_{k,l} N_{2,k,g}(u) N_{2,l,h}(v)$$

with the knot sequences $g=\{g_k\}_{k=0}^{K+1}$ and $h=\{h_l\}_{l=0}^{L+1}$ where $g_k=g(r,k-1,p)$ and $h_l=g(s,l-1,q)$. (Note, by this definition, end knots $g_0=g_1=0$ and $g_K=g_{K+1}=1$ have the correct multiplicity 2; similar for $h_l$.)

Finally, the B-surface of same orders and knot sequences as the output surface c that interpolates the base surface b at the Greville abscissae is denoted by:

$$I(b)(u,v) = \sum_{i=0}^{I-1}\sum_{j=0}^{J-1} b^*_{i,j} N_{m,i,u}(u) N_{n,j,v}(v)$$

with respect to knot sequence u and v. In other words, I(b) satisfies the interpolation condition:

$$I(b)(u_i^*,v_j^*)=b(u_i^*,v_j^*), i=0\ldots I-1, j=0,\ldots,J-1.$$

where $u_i^*=g(m,i,u)$ and $v_j^*=g(n,j,v)$. Here the Greville abscissae preferably satisfies the Schoenberg-Whitney condition and, therefore B-surface I(b) is uniquely determined by the interpolation conditions.

3. Satisfying Conditions

Decomposition and reconstruction are constructed such that design intent and transform operation are captured in order to satisfy the following conditions:

3.1 Stability under changes between base and output surface. From the decomposition if changes between base surface b and output surface c are small, the delta surface d is small as well.

3.2 Stability under changes of base surfaces. If the base surface b is replaced by a new base surface b̃ after the decomposition and a new output surface c̃ is reconstructed from b̃ and d, small changes in the shape between the base surfaces, b and b̃ result in small changes between the output surfaces, c and c̃.

3.3 Invariance under representation change of the base surface. To make the decomposition invariant under representation change of the base surface, i.e., if b and b̃ represent the same surface, meaning b(u,v)=b̃(u,v) for all (u, v), preferably expect the same for the output surfaces c and c̃. Note that a B-surface can have different representations. For instance, different representations of the same B-surface can be obtained by degree elevation for single-patch surfaces or by knot insertion in general.

3.4 Preservation of $C^n$ boundary constraints under common transform operations. It is common that the output surface c is obtained from the base surface b by knot insertion or degree elevation, i.e., c has refined knot sequences compared to the knot sequences of b. The base surface can be represented in the same orders and knot sequences as the output surface. If this is the case, the base surface b and the output surface c share the same $C^n$ constraints along an iso-parametric boundary as long as the row of control points (poles) of this boundary and neighboring rows of control points of the output surface c are not moved. Construct a decomposition-reconstruction scheme that preserves these $C^n$ constraints, i.e., if the base surface b is replaced by a new base surface b̃ (which also needs be represented in orders and knot sequences of c) and reconstruct again a new output surface c̃ from b̃ and the previously decomposed delta surface d, expect the new base surface b̃ and the new output surface c̃ also to shared $C^n$ constraints along the same iso-parametric boundary.

3.5 Invariance under common affine transformations. To ensure the decomposition and reconstruction are invariant under certain affine transformations such as rotation, translation and uniform scaling, that means that if b̃ is obtained from b by such a transformation, c̃, reconstructed from b̃ and d, is the image of c under the same affine transformation.

4. Decomposition and Reconstruction Algorithms

Figure 2:
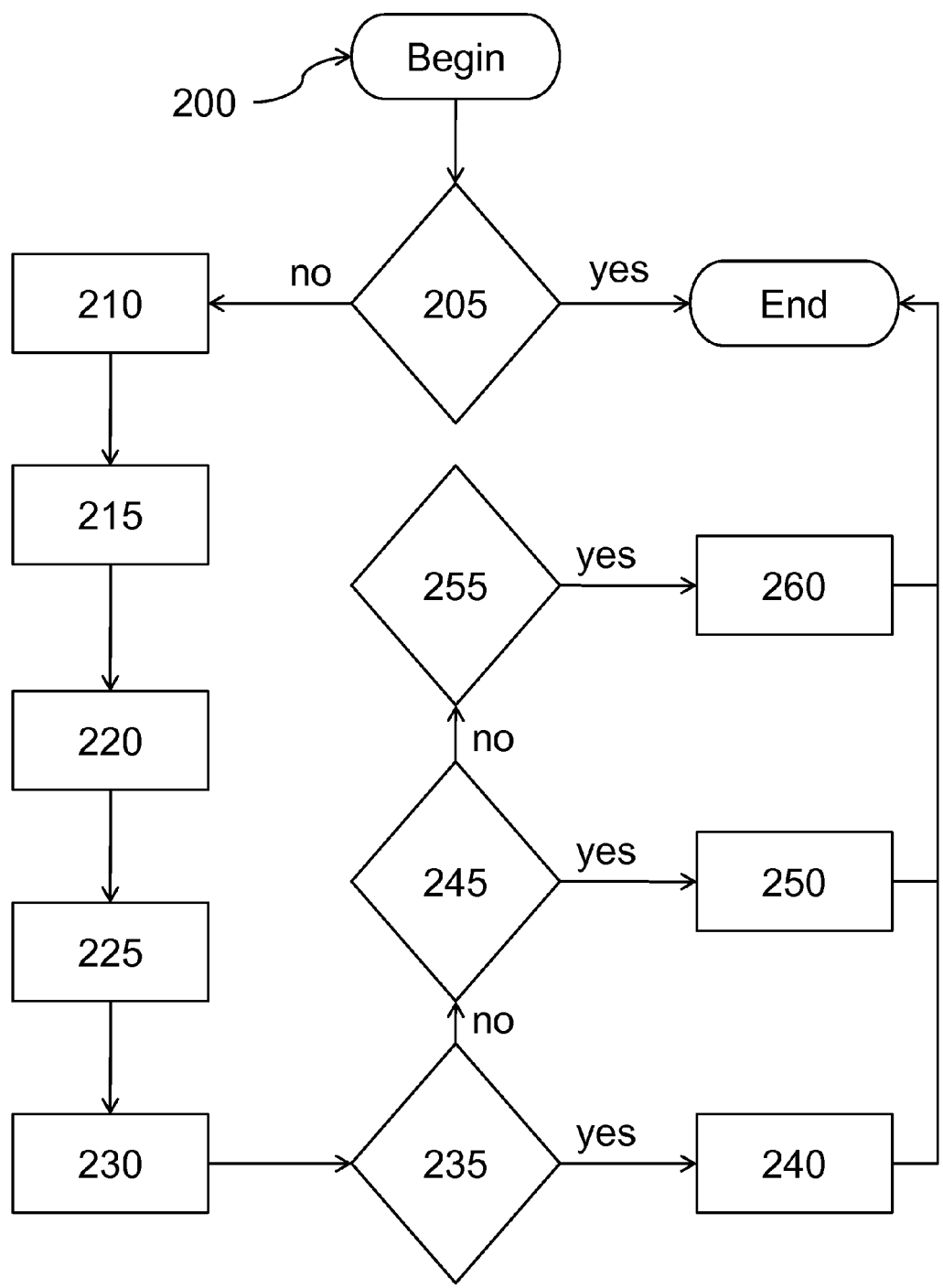
FIG. 2 is a flow chart for a method, according to the presently preferred embodiment, for composing NURBS surfaces using the system of FIG. 4.

FIG. 2 is a flow chart for a method, according to the presently preferred embodiment, for composing NURBS surfaces using the system of FIG. 4. Referring further to FIG. 2, the methodology begins after bubble 200 and advances to block 205. In block 205, if the base surface b and the output surface c have the same orders and knot sequences the preferred way to define the decomposition is by setting $d_{i,j}=c_{i,j}-b_{i,j}$. The reconstruction is simply performed by $c_{i,j}=b_{i,j}+d_{i,j}$. If the base surface b and the transformed output surface c do not agree in orders and knot sequences in general, continue to block 210 and replace $b_{i,j}$ by an appropriate point at Greville abscissae on the piece-wise bilinear surface P(b) formed by the control polygon of b: $d_{i,j}=c_{i,j}-P(b)(u_i^*,v_j^*)$. The reconstruction is again the reverse operation: $c_{i,j}=P(b)(u_i^*,v_j^*)+d_{i,j}$. The decomposition and reconstruction represented at block 210 satisfy the conditions 3.1 and 3.2, subra, they fail to satisfy 3.3 of the invariance under different representations of the base surface b.

To satisfy condition 3.3, the base point is evaluated directly from the base surface b instead from the control polygon P(b) in block 215. Thus the decomposition and reconstruction has the form $d_{i,j}=c_{i,j}-(b)(u_i^*,v_j^*)$ and $c_{i,j}=b(u_i^*,v_j^*)+d_{i,j}$. This approach has the advantage that decomposition and reconstruction are based on the shape of the base surface b, not on a particular B-spline representation of the surface. Furthermore, with this approach, decomposition and reconstruction becomes independent of the control points of the base surface b and these operations could be applied to any surface type, not just B-surfaces that give rise to a general surface deformation tool. The approach identified in block 215 does not satisfy the stability condition of 3.1.

To improve stability and satisfy condition 3.1, the first two approaches are combined into a third at block 220 that begins with interpolating the base surface b at the Greville abscissae of the output surface c to obtain control points that are independent from the particular B-surface representation of the base surface b and, decompose c based on b by taking the difference between the control points of output surface c and interpolation surface, $d_{i,j}=c_{i,j}-b_{i,j}$, where $b_{i,j}$ are the control points of the interpolation surface I(b). The reconstruction is again the reverse operation, $c_{i,j}=b_{i,j}+d_{i,j}$. It is now verifiable that the decomposition-reconstruction scheme identified at block 220 satisfies conditions 3.1, 3.2, and 3.3. Continuing with block 225, if the base surface b can be represented in the orders and knot sequences of the output surface c, this representation is obtained from the interpolation surface, i.e., b(u,v)=I(b) (u,v) for all parameters (u,v). In other words, this representation of b has $b_{i,j}^*$ as its control points. If the row of control points along a boundary and the n neighboring rows of control points of the output surface c are not moved, $c_{i,j}=b_{i,j}^*$ and, hence, $d_{i,j}=0$ for these rows of control points. At block 225, the condition 3.4 is now also satisfied.

To resolve condition 3.5 of invariance under certain affine transformations at block 230, align an individual pole $c_{i,j}$ of the delta surface d based on a local coordinate system of first partial derivatives and scaled surface normal at the base point of the base surface b. The decomposition scheme is given by the equation:

$$d_{i,j}=M_{i,j}^{-1}(c_{i,j}-b_{i,j}^*), i=0\ldots I-1, j=0,\ldots,J-1, \quad (1)$$

with the control points $b_{i,j}^*$ of the interpolation surface I(b) and the 3×3 matrix:

$$M_{i,j}=\left(b_u(u_i^*,v_j^*), b_v(u_i^*,v_j^*), 2\cdot\frac{b_u(u_i^*,v_j^*)\times b_v(u_i^*,v_j^*)}{\|b_u(u_i^*,v_j^*)\|+\|b_v(u_i^*,v_j^*)\|}\right).$$

The matrix $M_{i,j}$ is invertible as long as the partial derivatives $b_u(u_i^*,v_j^*)$ and $b_v(u_i^*,v_j^*)$ are not collinear or do not vanish, i.e., b is assumed to be a regular or non-degenerated surface. The particular scaling of the surface normal (last column of $M_{i,j}$) are discussed in more detail below. The reconstruction is again simply the reverse operation $$c_{i,j}=b_{i,j}^*+M_{i,j}d_{i,j}, i=0\ldots I-1, j=0,\ldots,J-1 \quad (2)$$

The affine transformation preferably consists of rotations, translations and uniform scaling that can be described by a map y=Ax+t where A is in an orthogonal 3×3 matrix with a positive determinant and t is a 3D translation vector. More specifically, $A^TA=AA^T=\text{diag}(\lambda^2,\lambda^2,\lambda^2)$ and $\det(A)=\lambda^3$, where $\lambda>0$ is the uniform scaling factor. Assuming $\tilde{b}(u,v)=Ab(u,v)+t$,:

$$\tilde{c}(u,v)=Ac(u,v)+t. \quad (3)$$

5. Rational and Periodic B-Surface

The decomposition and reconstruction Equations (1) and (2), respectively, preferably use point interpolation of the base surface b, so no change for rational or periodic base surfaces is required. If in block 235, on the other hand, the output surface c is rational:

$$c(u,v)=\frac{\sum_{i=0}^{I-1}\sum_{j=0}^{J-1}w_{i,j}c_{i,j}N_{m,i,u}(u)N_{n,j,v}(v)}{\sum_{i=0}^{I-1}\sum_{j=0}^{J-1}w_{i,j}N_{m,i,u}(u)N_{n,j,v}(v)}$$

Use the same weights $w_{i,j}$ for the delta surface d:

$$d(u,v)=\frac{\sum_{i=0}^{I-1}\sum_{j=0}^{J-1}w_{i,j}d_{i,j}N_{m,i,u}(u)N_{n,j,v}(v)}{\sum_{i=0}^{I-1}\sum_{j=0}^{J-1}w_{i,j}N_{m,i,u}(u)N_{n,j,v}(v)}$$

The formulae previously derived for $c_{i,j}$ and $d_{i,j}$ stay valid and, in particular, Equation (3) is still true at block 240. Note that the poles of the rational output surface will have the form of 4d vectors, $(w_{i,j}c_{i,j}, w_{i,j})$, and will have to be "de-weighted" before decomposition and "re-weighted" after reconstruction.

If the output surface is periodic in u-direction at block 245 there is a number $\mu\in\{1,\ldots,m-1\}$ of 1-periodic knots and duplicate poles at block 250, weights (if rational), i.e., $u_i=u_{i+I-u}-1, u_{i+I+m-\mu}=u_{i+m}+1$ and $c_{i+I-\mu j}=c_{i,j}, w_{i+I-\mu j}=w_{i,j}$ for i=0, ..., μ–and all j. If the Greville abscissae $u_i^*$ falls out of the parameter range [0, 1], add 1 to $u_i^*$ if $u_i^*<0$ and subtract 1 from $u_i^*$ if $u_i^*>0$ as the output surface c, 1-periodic in the u-direction, can be viewed of as extended infinitely in the u-direction by c(u+k, v)=c(u, v) for all integers k. Otherwise, the decomposition and reconstruction scheme, Equations (1) and (2), respectively, can be performed without change. The delta surface d is be periodic in the u-direction as well and has the same number of duplicate poles as the output surface c. The same considerations apply if the output surface c is periodic in the v-direction at blocks 255 and 260, respectively.

6. Proof of Equation (3)

Where the proof for Equation (3) is provided as follows. Given:

$$I(\tilde{b})(u,v)=I(Ab+t)(u,v)=AI(b)(u,v)+t$$

because both B-surfaces, $I(\tilde{b})$ and AI(b) (u,v)+t satisfy the same interpolation conditions:

$$I(Ab+t)(u_i^*,v_j^*)=(Ab+t)(u_i^*,v_j^*)=Ab(u_i^*,v_j^*)+t=AI(b)(u_i^*,v_j^*)+t$$

and the solution to the interpolation problem is unique. Thus, from $I(\tilde{b})(u,v)=AI(b)(u,v)+t$, it follows:

$$\sum_{i=0}^{I-1}\sum_{j=0}^{J-1}\tilde{b}_{i,j}^*N_{m,i,u}(u)N_{n,j,v}(v)=\sum_{i=0}^{I-1}\sum_{j=0}^{J-1}(Ab_{i,j}^*+t)N_{m,i,u}(u)N_{n,j,v}(v)$$

and because $N_{m,i,u}(u)N_{n,j,v}(v)$ are linearly independent basis functions:

$$\tilde{b}_{i,j}^*=Ab_{i,j}^*+t, i=0,\ldots,I-1, j=0,\ldots,J-1 \quad (4)$$

Continuing with the proof for Equation (3), to prove:

$$\tilde{M}_{i,j}=AM_{i,j} \quad (5)$$

set, $$\tilde{M}_{i,j}=\left(\tilde{b}_u(u_i^*,v_j^*),\tilde{b}_v(u_i^*,v_j^*),2\cdot\frac{\tilde{b}_u(u_i^*,v_j^*)\times\tilde{b}_v(u_i^*,v_j^*)}{\|\tilde{b}_u(u_i^*,v_j^*)\|+\|\tilde{b}_v(u_i^*,v_j^*)\|}\right).$$

From $\tilde{b}=Ab+t$, it follows $\tilde{b}_u=Ab_u$ and $\|\tilde{b}_u\|^2=b_u^TA^TAb_u=\lambda^2\|b_u\|^2$. Hence $\|\tilde{b}_u\|=\lambda\|b_u\|$. Likewise, $\tilde{b}_v=Ab_v$ and $\|\tilde{b}_v\|=\lambda\|b_v\|$. And given that a transformation with an orthogonal matrix maintains angles and orientation $$\tilde{b}_u\times\tilde{b}_v=Ab_u\times Ab_v=\lambda A(b_u\times b_v).$$

And because $b_u\times b_v$ is orthogonal to $b_u$ and $b_v$ the implication is that $A(b_u\times b_v)$ is orthogonal to $Ab_u$ and $Ab_v$ because of:

$$\|\tilde{b}_u\times\tilde{b}_v\|=\|\tilde{b}_u\|\|\tilde{b}_v\|\sin(\tilde{b}_u,\tilde{b}_v)=\lambda^2\|b_u\|\|b_v\|\sin(b_u,b_v)=\lambda^2\|b_u\times b_v\|.$$

Thus, from Equation (4) and Equation (5), obtain the following:

$$\tilde{c}_{i,j}=\tilde{b}_{i,j}^*+\tilde{M}_{i,j}d_{i,j}=A(b_{i,j}^*+M_{i,j}d_{i,j})+t=Ac_{i,j}+t \quad (6)$$

Finally, because of the partition-of-unity property of B-splines:

$$\sum_{i=0}^{I-1}\sum_{j=0}^{J-1}N_{m,i,u}(u)N_{n,j,v}(v)=1$$

Equation (3) is solved as:

$$\tilde{c}(u,v)=\sum_{i=0}^{I-1}\sum_{j=0}^{J-1}(Ac_{i,j}+t)N_{m,i,u}(u)N_{n,j,v}(v)$$
$$=A\left(\sum_{i=0}^{I-1}\sum_{j=0}^{J-1}c_{i,j}N_{m,i,u}(u)N_{n,j,v}(v)\right)+t\left(\sum_{i=0}^{I-1}\sum_{j=0}^{J-1}N_{m,i,u}(u)N_{n,j,v}(v)\right)$$
$$=Ac(u,v)+t$$

7. Application

Figure 3A:
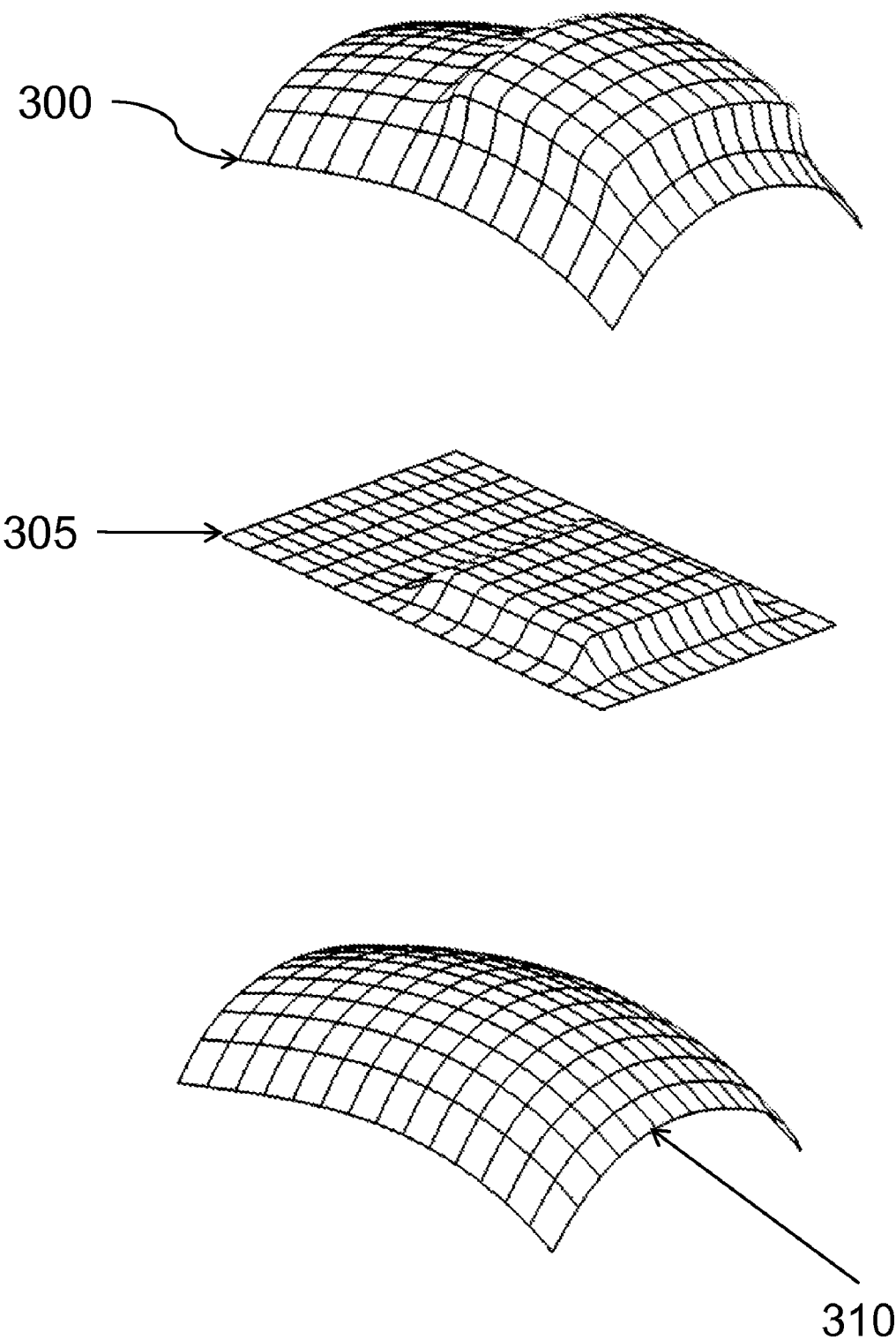
FIGS. 3a and 3b are an illustration of views of NURBS surfaces in various composed states.
Figure 3B:
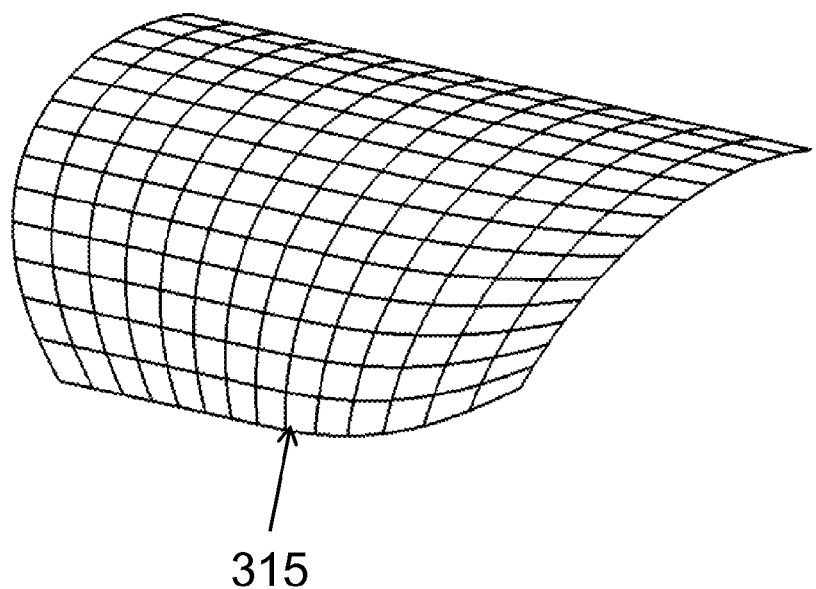
Figure 3B:
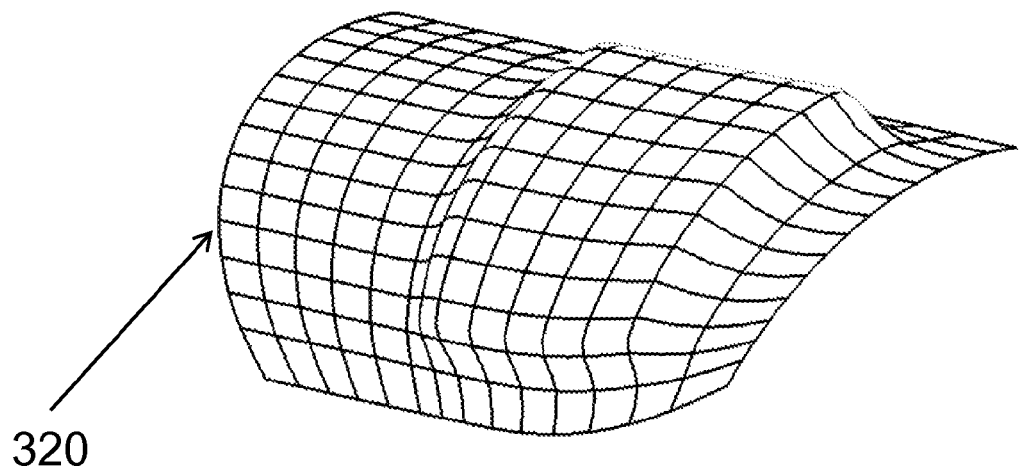

FIGS. 3a and 3b illustrate views of NURBS surfaces in various composed states. Referring further to FIGS. 3a and 3b, an transformed output surface 300 is a control-point-manipulated NURBS surface, or generically referred to as a B-surface, that is decomposed into a delta surface 305 and an original parent surface referred to as a base surface 310. Once the base surface 310 is modified by control-point manipulation, for example, a new base surface 315 is can involve changes on the base surface 310 related to control point positions as well as in order, patch count, and knot sequence. These changes performed on the base surface 310 are integrated back with the delta surface 305 to for a new output surface 320. This transform operation is referred to as the decomposition of c into d based on b. Put another way, the transformed output surface 300 is decomposed into the delta surface 305 based on the base surface 310. Likewise, the reverse is possible such that the reconstruction of $\tilde{c}$ from $\tilde{b}$ and d can be computed. Put another way, the reconstruction of the new output surface 320 from the new base surface 315 and the delta surface 305 is computed. The method for decomposition and reconstruction have been previously discussed and mathematically proven, as given above.

8. Conclusion

The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include numerous forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application2-specific integrated circuits).

A number of embodiments have been described. It will be understood that various modifications may be made without departing from the spirit and scope of the presently preferred embodiment. For example, the decomposition and reconstruction can apply to any surface in a computer modeling application that needs to modify features. Therefore, other implementations are within the scope of the following claims.

What is claimed is:

1. A method for preserving design intent of a Non-Uniform Rational B-spline (NURBS) surface without representation of a parent surface, comprising:

representing an output surface having control points that are independent from a refinement of said output surface, the output surface c defined by $$c(u,v)=\sum_{i=0}^{I-1}\sum_{j=0}^{J-1}c_{i,j}N_{m,i,u}(u)N_{n,j,v}(v);$$

interpolating a base surface from said output surface, the base surface b defined by $$b(u,v) = \sum_{k=0}^{K-1}\sum_{l=0}^{L-1} b_{k,l} N_{r,k,p}(u) N_{s,t,q}(v);$$

calculating a delta vector that is a difference between said output surface and said base surface; and transforming said delta vector based upon a local coordinate system of a normal vector and a tangent plane of said base surface to form a delta surface, wherein r>1, s>1, m>1, and n>1 are orders, $p=\{p_k\}_{k=0}^{K+r-1}$ and $q=\{q_l\}_{l=0}^{L+s-1}$ are knot sequences of b in a u-direction and a v-direction, respectively, $N_{r,k,p}$ denotes the $k^{th}$ normalized B-spline of order r with respect to a knot sequence p, $N_{s,l,q}$ denotes the $kl^{th}$ normalized B-spline of order s with respect to a knot sequence q, $b_{k,l} \in \mathbb{R}^3$ denotes a $(k,l)^{th}$ control point, $u=\{u_i\}_{i=0}^{l+m-1}$ and $v=\{v_j\}_{j=0}^{J+s-1}$ are knot sequences of b in a u-direction and a v-direction, respectively.

2. The method of claim 1, wherein said output surface is a NURBS surface.

3. The method of claim 1, wherein said refinement is a degree elevation.

4. The method of claim 1, wherein said refinement is a knot sequence.

5. The method of claim 1, wherein said interpolating of said base surface occurs at a Greville abscissae.

6. The method of claim 1, wherein said normal vector and said tangent plane are first partial derivatives.

7. The method of claim 1, wherein said transforming of said base surface occurs at an associated Greville abscissa.

8. The method of claim 1 further comprising:

generating a new output surface from a new base surface using the delta surface.

9. The method of claim 8, wherein the output surface is the NURBS surface, and wherein generating the new output surface comprises:

preserving the design intent of the NURBS surface in the new output surface by generating the new output surface from the new base surface using the transformed delta vector.

10. The method of claim 8, wherein the new surface is generated using the output surface without receipt of the parent surface and wherein the parent surface is an original surface modified to form the output surface.

11. A system for preserving design intent of a Non-Uniform Rational B-spline (NURBS) surface without representation of a parent surface, comprising:

a computer system, wherein said computer system includes a memory, a processor, a user input device, and a display device;

a computer generated geometric model stored in said memory of said computer system, wherein the geometric model is in a computer-aided design (CAD) format; and wherein the computer system is configured to:

represent an output surface having control points that are independent from a refinement of said output surface, the output surface c defined by $$c(u,v) = \sum_{i=0}^{I-1}\sum_{j=0}^{J-1} c_{i,j} N_{m,i,u}(u) N_{n,j,v}(v);$$

interpolate a base surface from said output surface, the base surface b defined by $$b(u,v) = \sum_{k=0}^{K-1}\sum_{l=0}^{L-1} b_{k,l} N_{r,k,p}(u) N_{s,t,q}(v),$$

calculate a delta vector that is a difference between said output surface and said base surface, and transform said delta vector based upon a local coordinate system of a normal vector and a tangent plane of said base surface to form a delta surface, wherein r>1, s>1, m>1, and n>1 are orders, $p=\{p_k\}_{k=0}^{k+r-1}$ and $q=\{q_l\}_{l=0}^{L+s-1}$ are knot sequences of b in a u-direction and a v-direction, respectively, $N_{r,k,p}$ denotes the $k^{th}$ normalized B-spline of order r with respect to a knot sequence p, $N_{s,l,q}$ denotes the $l^{th}$ normalized B-spline of order s with respect to a knot sequence q, $b_{k,l} \in \mathbb{R}^3$ denotes a $(k,l)^{th}$ control point, $u=\{u_i\}_{i=0}^{l+m-1}$ and $v=\{v_j\}_{j=0}^{J+s-1}$ are knot sequences of b in a u-direction and a v-direction, respectively.

12. The system of claim 11, wherein said output surface is a NURBS surface.

13. The system of claim 11, wherein said refinement is a degree elevation.

14. The system of claim 11, wherein said refinement is a knot sequence.

15. The system of claim 11, wherein said interpolating of said base surface occurs at a Greville abscissae.

16. The system of claim 11, wherein said normal vector and said tangent plane are first partial derivatives.

17. The system of claim 11, wherein said transforming of said base surface occurs at an associated Greville abscissa.

18. A data processing system for preserving design intent of a Non-Uniform Rational B-spline (NURBS) surface without representation of a parent surface, comprising:

a storage device storing program code; and a processor operably connected to the storage device, the processor configured to execute the program code to:

represent an output surface having control points that are independent from a refinement of said output surface, the output surface c defined by $$c(u,v) = \sum_{i=0}^{I-1}\sum_{j=0}^{J-1} c_{i,j} N_{m,i,u}(u) N_{n,j,v}(v);$$

interpolate a base surface from said output surface, the base surface b defined by $$b(u,v) = \sum_{k=0}^{K-1}\sum_{l=0}^{L-1} b_{k,l} N_{r,k,p}(u) N_{s,t,q}(v);$$

calculate a delta vector that is a difference between said output surface and said base surface; and transform said delta vector based upon a local coordinate system of a normal vector and a tangent plane of said base surface to form a delta surface, wherein $r>1$, $s>1$, $m>1$, and $n>1$ are orders, $p=\{p_k\}_{k=0}^{K+r-1}$ and $q=\{q_l\}_{l=0}^{L+s-1}$ are knot sequences of b in a u-direction and a v-direction, respectively, $N_{r,k,p}$ denotes the $k^{th}$ normalized B-spline of order r with respect to a knot sequence p, $N_{s,l,q}$ denotes the $l^{th}$ normalized B-spline of order s with respect to a knot sequence q, $b_{k,l} \in \mathbb{R}^3$ denotes a $(k,l)^{th}$ control point, $u=\{u_i\}_{i=0}^{I+m-1}$ and $v=\{v_j\}_{j=0}^{J+s-1}$ are knot sequences of b in a u-direction and a v-direction, respectively.

19. A system for preserving design intent of a Non-Uniform Rational B-spline (NURBS) surface without representation of a parent surface, comprising:

a computer system, wherein said computer system includes a memory, a processor, a user input device, and a display device;

a computer generated geometric model stored in said memory of said computer system, wherein the geometric model is in a computer-aided design (CAD) format; and wherein the computer system is configured to identify the NURBS surface, wherein the NURBS surface is a child surface formed from modification of the parent surface in accordance with the design intent, modify coordinates of said child surface independent from said parent surface to form a modified child surface, and preserve said design intent of the NURBS surface using the modified child surface.

* * * * *

UNITED STATES PATENT AND TRADEMARK OFFICE
CERTIFICATE OF CORRECTION

| | | |
|---|---|---|
| PATENT NO. | : 8,284,193 B2 | Page 1 of 1 |
| APPLICATION NO. | : 12/147270 | |
| DATED | : October 9, 2012 | |
| INVENTOR(S) | : Joerg Hanisch | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 905 days.

Signed and Sealed this
Twenty-sixth Day of August, 2014

Michelle K. Lee
*Deputy Director of the United States Patent and Trademark Office*